United States Patent
Liang

(10) Patent No.: US 12,531,071 B2
(45) Date of Patent: Jan. 20, 2026

(54) PACKET LOSS CONCEALMENT METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 685 days.

(21) Appl. No.: 17/667,487

(22) Filed: Feb. 8, 2022

(65) Prior Publication Data

US 2022/0165280 A1    May 26, 2022

Related U.S. Application Data

(63) Continuation of application No. PCT/CN2020/123826, filed on Oct. 27, 2020.

(30) Foreign Application Priority Data

Feb. 7, 2020 (CN) .......................... 202010082432.7

(51) Int. Cl.
G10L 19/005 (2013.01)
G10L 25/18 (2013.01)
G10L 25/21 (2013.01)
G10L 25/30 (2013.01)
G10L 25/45 (2013.01)

(52) U.S. Cl.
CPC .......... *G10L 19/005* (2013.01); *G10L 25/18* (2013.01); *G10L 25/21* (2013.01); *G10L 25/30* (2013.01); *G10L 25/45* (2013.01)

(58) Field of Classification Search
None
See application file for complete search history.

(56) References Cited

U.S. PATENT DOCUMENTS 9,916,837 B2 * 3/2018 Deng ................... H04L 65/762
10,127,918 B1 * 11/2018 Kamath Koteshwara ...................
G11B 27/038
2019/0051310 A1   2/2019 Chang et al.
(Continued)

FOREIGN PATENT DOCUMENTS

CN   110265046 A   9/2019
CN   111292768 A   6/2020

OTHER PUBLICATIONS

Hermansky, "Perceptual linear predictive (PLP) analysis of speech", J. Acoust. Soc. Am. 87, 1738-1752, 1990 (Year: 1990).*

(Continued)

*Primary Examiner* — Nicole A K Schmieder
(74) *Attorney, Agent, or Firm* — Anova Law Group, PLLC

(57) ABSTRACT

A packet loss concealment method includes: receiving a speech data packet; determining a speech power spectrum of speech data in the speech data packet in response to determining, according to the speech data packet, that a packet loss occurs; performing lost frame prediction on the speech power spectrum by using a neural network model, to obtain a predicted lost frame power spectrum; and determining restored speech data according to the speech power spectrum and the predicted lost frame power spectrum.

18 Claims, 8 Drawing Sheets

(56) References Cited

U.S. PATENT DOCUMENTS

2019/0080701 A1    3/2019  Cheluvaraja et al.
2021/0335378 A1   10/2021  Liang
2022/0239414 A1*   7/2022  Yang .................... H04L 1/0014

OTHER PUBLICATIONS

Backstrom et al., "Blind Recovery of Perceptual Models in Distributed Speech and Audio Coding", Interspeech 2016 (Year: 2016).*
Lotfidereshgi, Reza, and Philippe Gournay. "Speech prediction using an adaptive recurrent neural network with application to packet loss concealment." 2018 IEEE international conference on acoustics, speech and signal processing (ICASSP). IEEE, 2018. (Year: 2018).*
The World Intellectual Property Organization (WIPO) International Search Report for PCT/CN2020/123826 Jan. 27, 2021 7 Pages (including translation).
Bong-Ki Lee et al., "Packet Loss Concealment Based on Deep Neural Networks for Digital Speech Transmission," IEEE/ACM Transactions on Audio, Speech, and Language Processing, vol. 24. No. 2. Feb. 28, 2016 (Feb. 28, 2016). 10 pages.

* cited by examiner

PACKET LOSS CONCEALMENT METHOD AND APPARATUS, STORAGE MEDIUM, AND COMPUTER DEVICE

CROSS-REFERENCES TO RELATED APPLICATIONS

This application is a continuation application of PCT Patent Application No. PCT/CN2020/123826, entitled "PACKET LOSS HIDING METHOD AND APPARATUS, STORAGE MEDIUM, AND COMPUTER DEVICE" and filed on Oct. 27, 2020, which claims priority to Chinese Patent Application No. 202010082432.7, entitled "PACKET LOSS HIDING METHOD AND APPARATUS, STORAGE MEDIUM, AND COMPUTER DEVICE" filed with the China National Intellectual Property Administration on Feb. 7, 2020, the entire contents of both of which are incorporated herein by reference.

FIELD OF THE TECHNOLOGY

The present disclosure relates to the field of network communication technologies, and in particular, to a packet loss concealment method and apparatus, a storage medium, and a computer device.

BACKGROUND OF THE DISCLOSURE

A packet loss inevitably occurs during speech transmission, and the packet loss is one of the main reasons affecting the speech call quality. A packet loss concealment technology refers to the use of a synthesized speech data packet to compensate for a lost packet, thereby reducing the impact of a packet loss on the speech quality during transmission.

In a conventional packet loss concealment solution, when a packet loss occurs, a pitch period is obtained by estimating a previous frame of a signal of the packet loss, and a final pitch period waveform signal of the previous frame is copied to a frame position of the packet loss. In the foregoing solution, it is assumed that the position of the packet loss is extremely close to the previous frame of a signal of the packet loss. However, actually, there is a quite high probability that there is a difference between adjacent speech signals, and all subtle differences may be perceived by human ears. Therefore, the speech call quality is poor.

SUMMARY

According to embodiments of the present disclosure, a packet loss concealment method and apparatus, a storage medium, and a computer device are provided.

A packet loss concealment method is provided, performed by a computer device, the method including: receiving a speech data packet; determining a speech power spectrum of speech data in the speech data packet in response to determining, according to the speech data packet, that a packet loss occurs; performing lost frame prediction on the speech power spectrum by using a neural network model, to obtain a predicted lost frame power spectrum; and determining restored speech data according to the speech power spectrum and the predicted lost frame power spectrum.

A packet loss concealment apparatus is provided, including: a receiving module, configured to receive a speech data packet; a transform module, configured to determine a speech power spectrum of speech data in the speech data packet in response to determining, according to the speech data packet, that a packet loss occurs; a prediction module, configured to perform lost frame prediction on the speech power spectrum by using a neural network model, to obtain a predicted lost frame power spectrum; and an inverse transform module, configured to determine restored speech data according to the speech power spectrum and the predicted lost frame power spectrum.

A non-transitory computer-readable storage medium is provided, storing a computer program, the computer program, when executed by a processor, causing the processor to perform operations in the packet loss concealment method.

A computer device is provided, including a memory and a processor, the memory storing a computer program, the computer program, when executed by the processor, causing the processor to perform: receiving a speech data packet; determining a speech power spectrum of speech data in the speech data packet in response to determining, according to the speech data packet, that a packet loss occurs; performing lost frame prediction on the speech power spectrum by using a neural network model, to obtain a predicted lost frame power spectrum; and determining restored speech data according to the speech power spectrum and the predicted lost frame power spectrum.

Details of one or more embodiments of the present disclosure are provided in the following accompany drawings and descriptions. Other features and advantages of the present disclosure become apparent from the specification, the accompanying drawings, and the claims.

BRIEF DESCRIPTION OF THE DRAWINGS

The accompanying drawings described herein are used for providing a further understanding of the present disclosure, and form a part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

Figure 1:
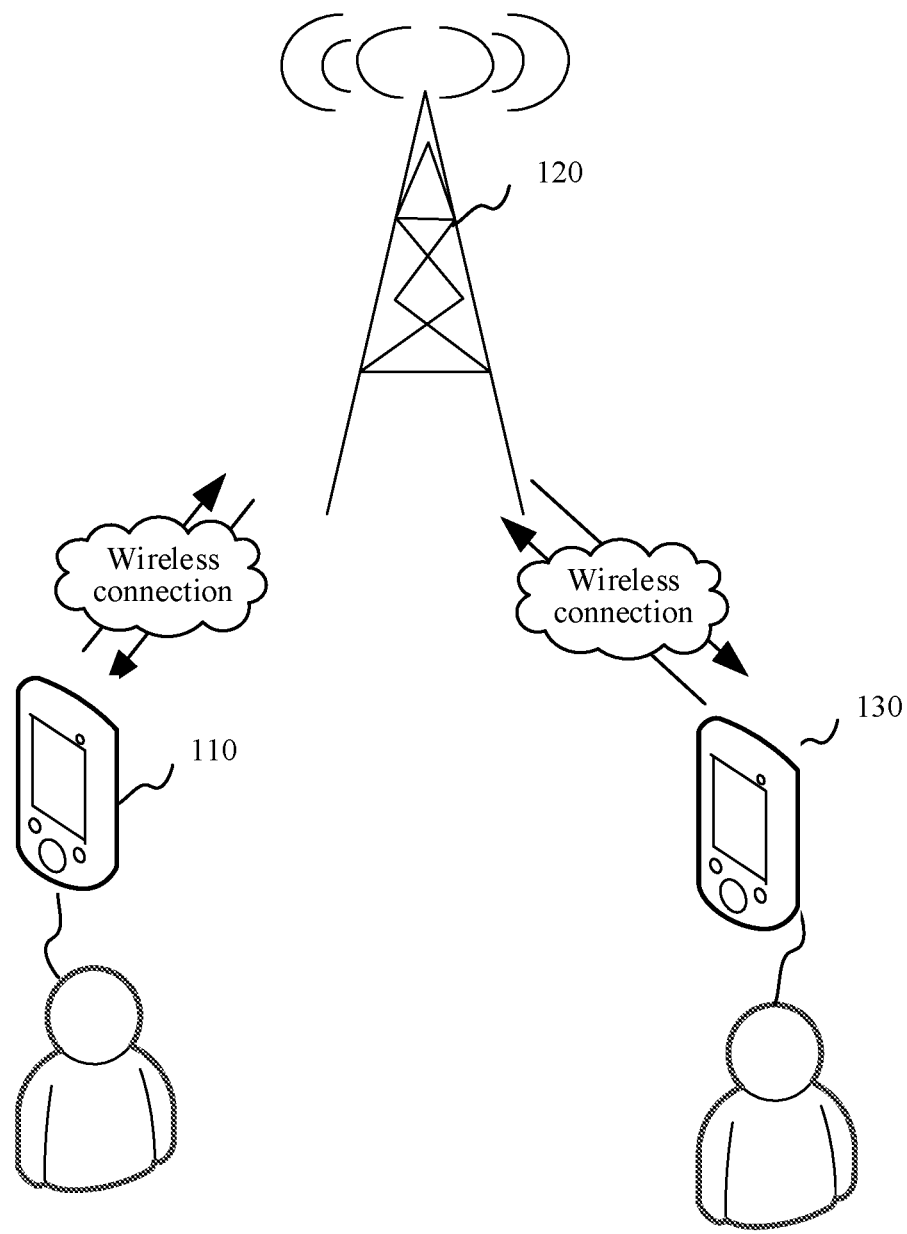
FIG. 1 is a diagram of an application environment of a packet loss concealment method in an embodiment.

To make the objectives, technical solutions, and advantages of the present disclosure clearer and more understandable, the present disclosure is further described in detail below with reference to the accompanying drawings and the embodiments. The specific embodiments described herein are only used for explaining the present disclosure, and are not used for limiting the present disclosure.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study design principles and implementation methods of various intelligent machines, so that the machines have functions of perception, reasoning, and decision-making.

The AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operation/interaction system, or mechatronics. AI software technologies mainly include fields such as a CV technology, a speech processing technology, a natural language processing technology, and machine learning (ML)/deep learning (DL).

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Natural language processing (NLP) is an important direction in the field of computer technologies and the field of AI. NLP studies various theories and methods for implementing effective communication between human and computers in a natural language. NLP is a science that integrates linguistics, computer science and mathematics. Therefore, studies in this field relate to a natural language, that is, a language used by people in daily life, so the NLP is closely related to linguistic studies. The NLP technology generally includes technologies such as text processing, semantic understanding, machine translation (MT), robot question and answering, and knowledge graph.

ML is an interdisciplinarity involving a plurality of disciplines such as the probability theory, statistics, approximation theory, convex analysis, algorithm complexity theory, and the like. The ML specializes in studying how a computer simulates or implements a human learning behavior to obtain new knowledge or skills, and reorganize an existing knowledge structure, so as to keep improving performance of the computer. The ML is a core of the AI, is a basic way to make the computer intelligent, and is applied to various fields of the AI. The machine learning and deep learning generally include technologies such as an artificial neural network, a belief network, reinforcement learning, transfer learning, inductive learning, and learning from demonstrations.

Autonomous driving technologies generally include technologies such as high-precision maps, environment perception, behavior decision-making, path planning, and motion control, and the autonomous driving technology has a wide range of application prospects.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure relate to speech technologies of the AI, and are specifically described by using the following embodiments.

FIG. 1 is a diagram of an application environment of a packet loss concealment method in an embodiment. Referring to FIG. 1, the packet loss concealment method is applied to a packet loss concealment system. The packet loss concealment system includes a terminal 110, a base station system 120, and a terminal 130. The terminal 110, the base station system 120, and the terminal 130 are connected through a mobile communication network (as shown in FIG. 1). In addition, the terminal 110, the base station system 120, and the terminal 130 may alternatively be connected through a computer network (not shown in FIG. 1). The terminal 110 serves as a receiving end, and the terminal 130 serves as a sending end. The terminal 110 receives a speech data packet sent by the terminal 130 through the base station system 120 and another transmission network; determines a speech power spectrum of speech data in the speech data packet in response to determining, according to the speech data packet, that a packet loss occurs; performs lost frame prediction on the speech power spectrum by using a neural network model, to obtain a lost frame power spectrum; and determines restored speech data according to the speech power spectrum and a predicted lost frame power spectrum.

The terminal 110 and the terminal 130 may be specifically desktop terminals or mobile terminals, and the mobile terminal may be specifically at least one of a mobile phone, a tablet computer, a notebook computer, and the like. The base station system 120 may be a wireless transceiver system of a 2G, 3G, 4G, or 5G communication network.

Figure 2:
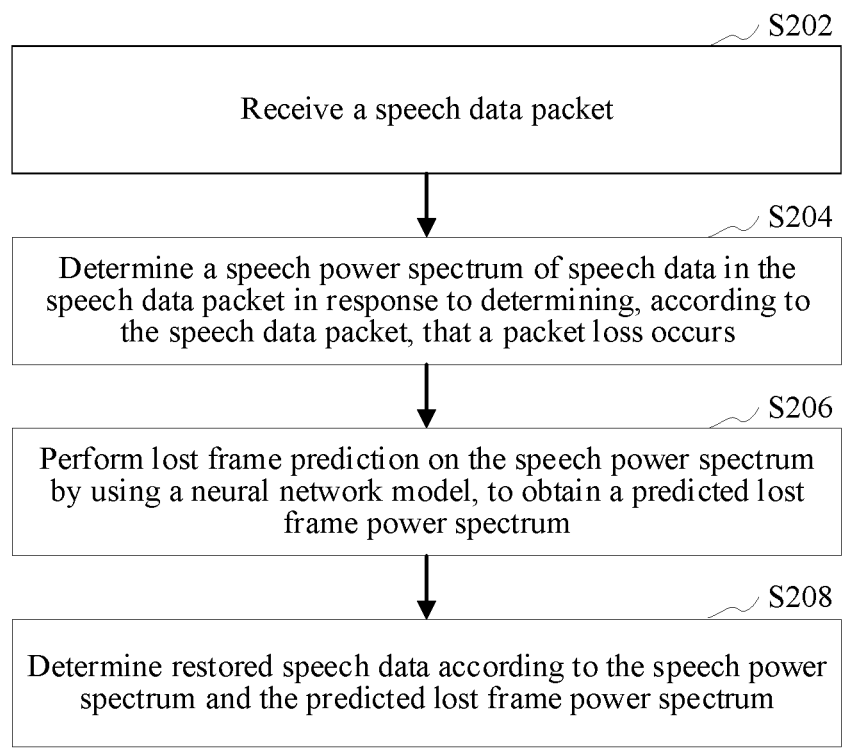
FIG. 2 is a schematic flowchart of a packet loss concealment method in an embodiment.

As shown in FIG. 2, in an embodiment, a packet loss concealment method is provided. In this embodiment, description is provided mainly by using an example in which the method is applied to the terminal 110 in FIG. 1. Referring to FIG. 2, the packet loss concealment method specifically includes the following steps:

S202. Receive a speech data packet.

The speech data packet may be a speech data packet obtained by encapsulating speech data to be sent according to a communication protocol before the sending end sends the speech data. The communication protocol may be a protocol such as a real-time transport protocol (RTP), a transmission control protocol (TCP), or a user datagram protocol (UDP).

In an embodiment, the terminal receives a speech data packet sent in real time by the sending end through a mobile communication network or a computer network. Each speech data packet may be provided with a corresponding packet serial number. For example, a packet serial number is provided in a packet header.

S204. Determine a speech power spectrum of speech data in the speech data packet in response to determining, according to the speech data packet, that a packet loss occurs.

In an embodiment, S204 may specifically include: transforming, by the terminal, speech data in the speech data packet, to obtain a speech power spectrum according to a transform result.

The transform may include discrete Fourier transform, bark domain transform, and Mel scale transform. In addition, the transform may further include linear frequency domain transform and equivalent rectangular bandwidth (ERB) scale transform. The speech data may be pulse code modulation (PCM) speech data.

Therefore, S204 may be divided in the following transform manners for description.

Manner 1: Performing Fourier Transform.

In an embodiment, S204 may specifically include: decoding, by the terminal, the speech data packet, to obtain speech data; performing Fourier transform on the speech data, to obtain frequency domain speech data; and calculating power values of frequency points according to the frequency domain speech data, to obtain a speech power spectrum in a linear frequency domain, and then performing S206.

In an embodiment, before the step of performing Fourier transform on the speech data, the method may further include: framing, by the terminal, the speech data; and then windowing the framed speech data, to obtain windowed speech data for buffering.

For example, the speech data is framed with a window length of 20 ms as one frame, and the framed speech data is then windowed by using a window function. The window function may be a rectangular window function, a Hamming window function, a Hamming window function, a Blackman window function, or the like. The Hamming window function is used as an example. The window function is as follows:

$$\text{win}(n) = 0.5 \times \left(1 + \cos\left(2\pi \frac{n}{N-1}\right)\right)$$

$$n \text{ belonging to } \left[-\frac{N-1}{2}, \frac{N-1}{2}\right].$$

After speech data is windowed, the windowed speech data x(n)win(n) is obtained, and discrete Fourier transform is then performed on the windowed speech data x(n)win(n) by using a discrete Fourier transform formula, to obtain frequency domain speech data. The frequency domain speech data is shown as follows:

$$X(i,k) = \sum_{n=0}^{N-1} x(n)\text{win}(n)e^{-j\frac{2\pi nk}{N}} \quad k = 1, 2, 3, \ldots, N$$

i corresponding to a frame serial number, k corresponding to a frequency point index value, and N being a window length (that is, a total quantity of sample points in a single window).

Then, the terminal calculates a speech power spectrum according to the frequency domain speech data, and the calculated speech power spectrum is as follows:

$$S(i,k) = |X(i,k)|^2 \quad k = 1, 2, 3, \ldots, N$$

Manner 2: Performing Fourier Transform and Bark Domain Transform.

In an embodiment, the terminal decodes the speech data packet, to obtain speech data; performs Fourier transform on the speech data, to obtain frequency domain speech data; and calculates power values of frequency points according to the frequency domain speech data, to obtain a speech power spectrum in a linear frequency domain. The terminal performs bark domain transform on the speech power spectrum in a linear frequency domain, to obtain a speech power spectrum in a bark domain, and then performs S206.

In an embodiment, the terminal may then perform average calculation on power spectrum values in bark domain sub-bands according to 24 bark domains (where a frequency domain criticality is defined as shown in Table 1) simulated based on an auditory filter proposed by Eberhanrd Zwicker, to obtain a speech power spectrum in a bark domain.

TABLE 1

| 24 critical frequency bands | | | |
|---|---|---|---|
| Critical frequency band | Center (Hz) | Cut-off frequency (Hz) | Bandwidth |
|  |  | 20 |  |
| 1 | 50 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |
| 9 | 1000 | 1080 | 160 |
| 10 | 1170 | 1270 | 190 |
| 11 | 1370 | 1480 | 210 |
| 12 | 1600 | 1720 | 240 |
| 13 | 1850 | 2000 | 280 |
| 14 | 2150 | 2320 | 320 |
| 15 | 2500 | 2700 | 380 |
| 16 | 2900 | 3150 | 450 |
| 17 | 3400 | 3700 | 550 |
| 18 | 4000 | 4400 | 700 |
| 19 | 4800 | 5300 | 900 |
| 20 | 5800 | 6400 | 1100 |
| 21 | 7000 | 7700 | 1300 |
| 22 | 8500 | 9500 | 1800 |
| 23 | 10500 | 12000 | 2500 |
| 24 | 13500 | 15500 | 3500 |

In an embodiment, the terminal performs bark domain transform on the speech power spectrum in a linear frequency domain by using a bark domain transform formula, to obtain the speech power spectrum in a bark domain, the bark domain transform formula being as follows:

$$S_{bark}(i,m) = \frac{1}{f_{top}(m) - f_{bottom}(m) + 1} \times \sum_{j=f_{bottom}(m)}^{f_{top}(m)} S(i,j)$$

m being a bark sub-band serial number, $f_{top}(m)$ and $f_{bottom}(m)$ being respectively an upper limit of a cut-off frequency and a lower limit of the cut-off frequency of a linear frequency corresponding to an $m^{th}$ sub-band in the bark domain, and S(i,j) being the speech power spectrum in a linear frequency domain. For example, for a sub-band serial number 1, a corresponding upper limit of the cut-off frequency is $f_{top}(m)=100$, and a corresponding lower limit of the cut-off frequency is $f_{top}(m)=100$. For a sub-band serial number 2, a corresponding upper limit of the cut-off frequency is $f_{bottom}(m)=100$, and a corresponding lower limit of the cut-off frequency is $f_{top}(m)=200$.

Method 3: Performing Fourier Transform and Mel Scale Transform.

In an embodiment, the terminal decodes the speech data packet, to obtain speech data; performs Fourier transform on the speech data, to obtain frequency domain speech data; and calculates power values of frequency points according to the frequency domain speech data, to obtain a speech power spectrum in a linear frequency domain. The terminal performs Mel scale transform on the speech power spectrum in a linear frequency domain, to obtain a speech power spectrum in a Mel scale, and then performs S206.

The terminal calculates the corresponding power spectrum, obtains a logarithmic value of the power spectrum to obtain a logarithmic power spectrum, inputs the logarithmic power spectrum into a triangular filter in a Mel scale, and obtains a Mel frequency cepstrum coefficient through discrete cosine transform. The obtained Mel frequency cepstrum coefficient is as follows:

$$C(n) = \sum_{m=1}^{N-1} S(i, m) \cos\left(\frac{\pi n(m - 0.5)}{M}\right), n = 1, 2 \ldots L$$

The foregoing logarithmic energy is brought into the discrete cosine transform, to find a Mel frequency cepstrum parameter in an L order, where the L order refers to an order of the Mel frequency cepstrum coefficient, and may range from 12 to 16. M refers to a quantity of triangular filters.

S206. Perform lost frame prediction on the speech power spectrum by using a neural network model, to obtain a lost frame power spectrum.

The neural network model may be a convolutional neural network (CNN) model, a recurrent neural network (RNN) model, a deep neural network (DNN) model, or another network model. The neural network model is obtained by training speech data samples corresponding to quantities of packet losses, that is, is obtained by training a corresponding neural network model by using speech data samples with different quantities of packet losses. For example, when one packet loss occurs in a speech data sample, a neural network model 1 is trained by using the speech data sample; and when two consecutive packet losses (for example, packets with packet serial numbers 2 and 3) occur in a speech data sample, a neural network model 2 is trained by using the speech data sample, and the rest is deduced by analogy.

S208. Determine restored speech data according to the speech power spectrum and a predicted lost frame power spectrum.

In an embodiment, S208 may specifically include: performing inverse transform corresponding to the foregoing transform on the speech power spectrum and the predicted lost frame power spectrum, to obtain restored speech data.

Because three transform manners are used when the speech data is transformed, inverse transform manners corresponding to the three transform manners need to be used when inverse transform corresponding to the transform is performed on the speech power spectrum and the predicted lost frame power spectrum.

Manner 1: Performing Fourier Inverse Transform.

In an embodiment, the terminal obtains phase information of speech data of a previous frame of the lost packet during the Fourier transform; performs inverse transform corresponding to the transform on the speech power spectrum; and performs Fourier inverse transform by combining the phase information with the lost frame power spectrum. In some embodiments, the previous frame of the lost packet/frame may refer to a frame immediately preceding the lost packet/frame.

For example, if the speech power spectrum is $S(i,k)=|X(i,k)|^2$, $k=1, 2, 3, \ldots, N$, speech data $$X(i, k) = \sum_{n=0}^{N-1} x(n) \text{win}(n) e^{-j\frac{2\pi nk}{N}}$$

in a time domain may be obtained after the Fourier inverse transform.

Method 2: Performing Fourier Inverse Transform and Bark Domain Inverse Transform.

In an embodiment, the terminal separately performs bark domain inverse transform on the speech power spectrum and the predicted lost frame power spectrum; performs Fourier inverse transform on the speech power spectrum through the bark domain inverse transform; and performs Fourier inverse transform by combining phase information and the lost frame power spectrum through the bark domain inverse transform, the phase information being the phase information of the previous frame of speech data of the packet loss, to obtain restored speech data.

Manner 3: Performing Fourier Inverse Transform and Mel Scale Inverse Transform.

In an embodiment, the terminal separately performs Mel scale inverse transform on the speech power spectrum and the predicted lost frame power spectrum; performs Fourier inverse transform on the speech power spectrum through the Mel scale inverse transform; and performs Fourier inverse transform by combining phase information with the lost frame power spectrum through the Mel scale inverse transform, the phase information being the phase information of the previous frame of speech data of the packet loss, to obtain restored speech data.

In the foregoing embodiment, a speech power spectrum is determined by using speech data in the received speech data packet, and lost frame prediction is performed on the speech power spectrum by using the neural network model to obtain a lost frame power spectrum, so that a lost frame power spectrum corresponding to the speech data of the packet loss may be obtained, and restored speech data is obtained by using the speech power spectrum and the predicted lost frame power spectrum, thereby avoiding that a final pitch period waveform signal of a previous frame is directly copied to a frame position of the packet loss (i.e., position of the lost frame), and further avoiding the problem of the poor speech quality caused by a difference between adjacent speech signals. Consequently, the speech call quality is effectively improved.

Figure 3:
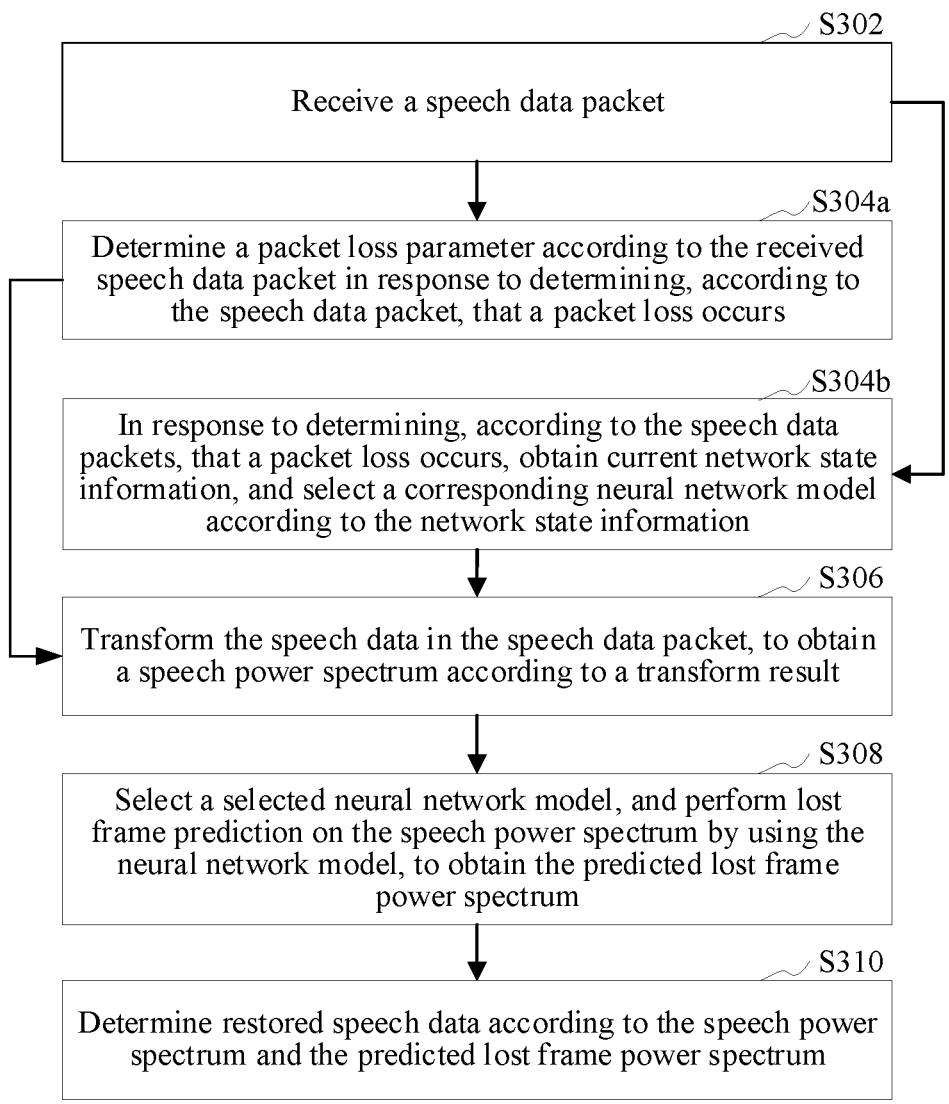
FIG. 3 is a schematic flowchart of a step of selecting a corresponding neural network model by using a quantity of packet losses and network state information, and predicting a lost frame power spectrum according to the selected neural network model in an embodiment.

In an embodiment, as shown in FIG. 3, the method further includes the following steps:

S302. Receive a speech data packet.

For S302, refer to S202 in the foregoing embodiment.

S304a. Determine a packet loss parameter according to the received speech data packet in response to determining, according to the speech data packet, that a packet loss occurs.

The packet loss refers to a situation of the speech data packet being inevitably lost during transmission. The packet loss parameter may be a quantity of packet losses or a packet loss rate.

In an embodiment, the terminal determines, according to packet serial numbers of the speech data packets, whether the packet loss occurs in the received speech data packets, and determines a quantity of packet losses according to the packet serial numbers in response to determining, according to the speech data packets, that a packet loss occurs. Each speech data packet may be provided with a corresponding packet serial number. For example, a packet serial number is provided in a packet header.

For example, assuming that the sending end sends speech data packets with packet serial numbers 1 to 10 respectively, if the speech data packets with the packet serial numbers 1 to 8 and 10 are received, the terminal may determine that the speech data packet with the packet serial number 9 is lost, and a quantity of packet losses is 1.

S304b. in response to determining, according to the speech data packets, that a packet loss occurs, obtain current network state information, and select a corresponding neural network model according to the network state information.

Network state refers to a strong/weak state or a stable state of a network signal, such as a strong/weak network signal, or a stable (and strong) or an unstable network signal. Correspondingly, the network state information refers to strong/weak state information of the network signal.

When the network state information is the strong network signal or the stable network signal, the speech data packet is not easily lost during transmission; and when the network state information is the weak network signal or the unstable network signal, the speech data packet is easily lost during transmission. The terminal selects a corresponding neural network model according to the network state information, and may obtain a neural network model that meets a current packet loss situation, so that a lost frame power spectrum may be effectively predicted.

S306. Transform the speech data in the speech data packet, to obtain a speech power spectrum according to a transform result.

For S306, refer to S204 in the foregoing embodiment.

S308. Select a selected neural network model, and perform lost frame prediction on the speech power spectrum by using the neural network model, to obtain a predicted lost frame power spectrum.

The foregoing quantity of packet losses refers to a quantity of consecutive packet losses in the received speech data packets, and the quantity is a maximum value in all quantities of packet losses. For example, assuming that the sending end sends speech data packets with packet serial numbers 1 to 10, if the receiving end receives the speech data packets the with packet serial numbers 1 to 8 and 10, the quantity of packet losses is 1; if the receiving end receives the speech data packets with the packet serial numbers 1 to 7 and 10, the quantity of packet losses is 2; and if the receiving end receives the speech data packets with the packet serial numbers 1 to 5, 8, and 10, the quantity of packet losses is 2.

The neural network model is obtained by training speech data samples corresponding to quantities of packet losses, that is, is obtained by training a corresponding neural network model by using speech data samples with different quantities of packet losses. Therefore, different quantities of packet losses correspond to different neural network models. For example, when one packet loss occurs in a speech data sample, a neural network model 1 is trained by using the speech data sample; and when two consecutive packet losses (for example, packets with packet serial numbers 2 and 3) occur in a speech data sample, a neural network model 2 is trained by using the speech data sample, and the rest is deduced by analogy.

S310. Determine restored speech data according to the speech power spectrum and the predicted lost frame power spectrum.

For S310, refer to S208 in the foregoing embodiment.

In the foregoing embodiment, different quantities of packet losses correspond to different neural network models. When the quantity packet losses is determined, a lost frame power spectrum is predicted by selecting a corresponding neural network model, to effectively compensate for packet losses with various quantities of packet losses, thereby effectively improving the speech call quality.

Figure 4:
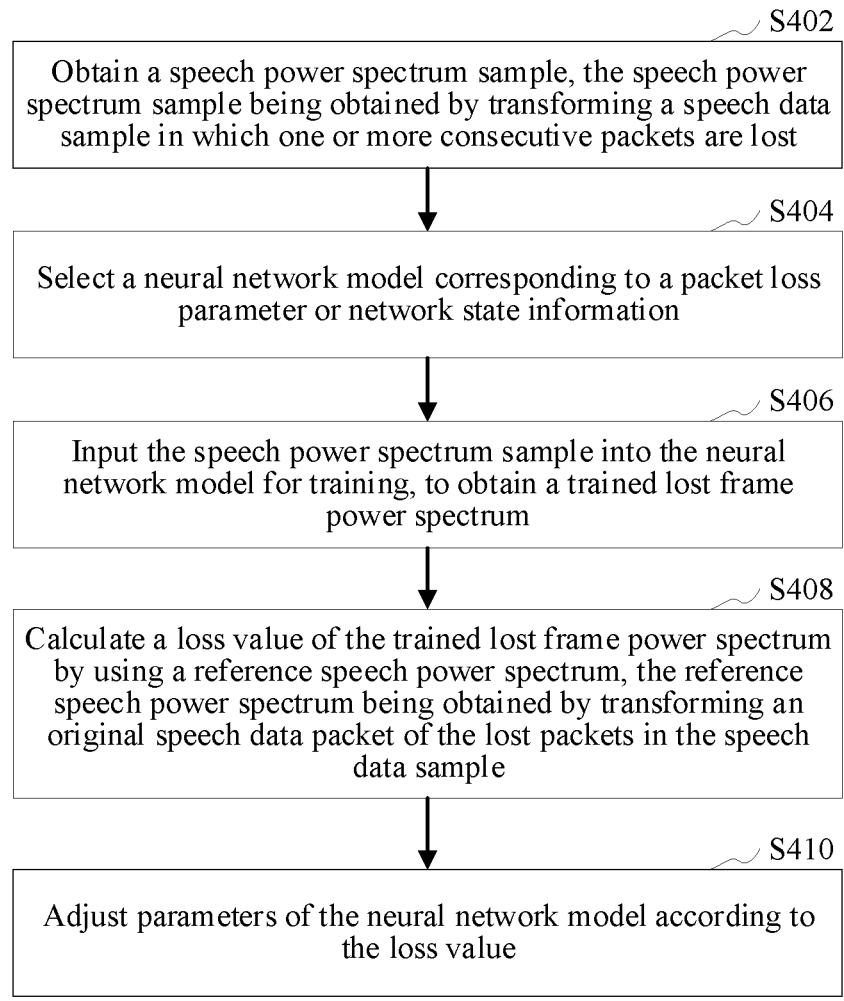
FIG. 4 is a schematic flowchart of training a neural network model in an embodiment.

In an embodiment, as shown in FIG. 4, the method may further include the following steps:

S402. Obtain a speech power spectrum sample, the speech power spectrum sample being obtained by transforming a speech data sample in which one or more consecutive packets are lost.

The speech power spectrum sample is a sample obtained by using a speech power spectrum in which one or more consecutive packets are lost, or is a sample obtained by performing Fourier transform on speech data in which one or more consecutive packets are lost, or is a sample obtained by performing Fourier transform and bark domain transform on speech data in which one or more consecutive packets are lost, or is a sample obtained by performing Fourier transform and Mel scale transform on speech data in which one or more consecutive packets are lost.

In an embodiment, the terminal obtains the speech data sample in which the one or more consecutive packets are lost; performs Fourier transform on the speech data sample, to obtain trained frequency domain speech data; and calculates power values of frequency points according to the trained frequency domain speech data, to obtain a speech power spectrum sample in a linear frequency domain.

In another embodiment, the terminal obtains the speech data sample in which the one or more consecutive packets are lost; performs Fourier transform on the speech data sample, to obtain trained frequency domain speech data; and calculates power values of frequency points according to the trained frequency domain speech data, to obtain a speech power spectrum sample in a linear frequency domain. The terminal performs bark domain transform on the speech power spectrum sample in a linear frequency domain, to obtain a speech power spectrum sample in a bark domain.

In another embodiment, the terminal obtains the speech data sample in which the one or more consecutive packets are lost; performs Fourier transform on the speech data sample, to obtain trained frequency domain speech data; and calculates power values of frequency points according to the trained frequency domain speech data, to obtain a speech power spectrum sample in a linear frequency domain. The terminal performs Mel scale transform on the speech power spectrum sample in a linear frequency domain, to obtain a speech power spectrum sample in a Mel scale.

S404. Select a neural network model corresponding to a packet loss parameter or network state information, the packet loss parameter being used for representing a packet loss situation of a packet loss occurring in the speech data sample, and may be specifically a quantity of packet losses or a packet loss rate. The packet loss rate may be a ratio of packet losses in the speech data packets. The quantity of packet losses is a quantity of packets that are consecutively lost in the speech data sample, and the quantity of packets is a maximum value in all quantities of packet losses. For example, an original speech data packet set includes speech data packets with packet serial numbers 1 to 10. If one packet loss needs to be simulated, one of the speech data packets with the packet serial numbers 1 to 10 is removed, or two nonconsecutive packets are removed. If a loss of two consecutive packets needs to be simulated, two packets with consecutive packet serial numbers are removed from the speech data packets with the packet serial numbers 1 to 10, for example, packets with packet serial numbers 8 and 9 are removed, and the rest is deduced by analogy.

Network state refers to a strong/weak state or a stable state of a network signal, such as a strong/weak network signal, or a stable (and strong) or an unstable network signal.

Correspondingly, the network state information refers to strong/weak state information of the network signal.

When the network state information is the strong network signal or the stable network signal, the speech data packet is not easily lost during transmission; and when the network state information is the weak network signal or the unstable network signal, the speech data packet is easily lost during transmission. The terminal selects a corresponding neural network model according to the network state information, and may obtain a neural network model that meets a current packet loss situation, so that a lost frame power spectrum may be effectively predicted.

S406. Input the speech power spectrum sample into the neural network model for training, to obtain a trained lost frame power spectrum.

In an embodiment, the terminal inputs the speech power spectrum sample in a linear frequency domain, or the speech power spectrum sample in a bark domain, or the speech power spectrum sample in a Mel scale into the neural network model for training, to obtain a trained lost frame power spectrum.

S408. Calculate a loss value of the trained lost frame power spectrum by using a reference speech power spectrum, the reference speech power spectrum being obtained by transforming an original speech data packet of the lost packets in the speech data sample.

In an embodiment, the terminal calculates a loss value of the trained lost frame power spectrum according to a loss function by using a reference speech power spectrum. The loss function may be any one of the following: a mean squared error (MSE) function, a cross-entropy loss function, an L2 Loss function, and a focal Loss function.

For example, assuming that the lost frame power spectrum is S(i,k), and the reference speech power spectrum is $S_0(i,k)$, a loss value $L=|S(i,k)-S_0(i,k)|^2$ or may be obtained by using the MSE function.

S410. Adjust parameters of the neural network model according to the loss value.

In an embodiment, the terminal back propagates the loss value to each layer of the neural network model, to obtain a gradient of a parameter of each layer; and adjusts the parameter of each layer in the neural network model according to the gradient, and performs training until the loss value drops to a minimum value or drops to a certain threshold, to obtain a trained neural network model.

In the foregoing embodiment, different neural network models are trained by using speech data samples with different quantities of packet losses, to obtain corresponding trained neural network models. Therefore, during actual application, when the terminal receives the speech data packets, if the packet loss is determined and a quantity of packet losses is determined, a lost frame power spectrum is predicted by selecting a corresponding neural network model, to effectively compensate for packet losses with various quantities of packet losses, thereby effectively improving the speech call quality.

Figure 5:
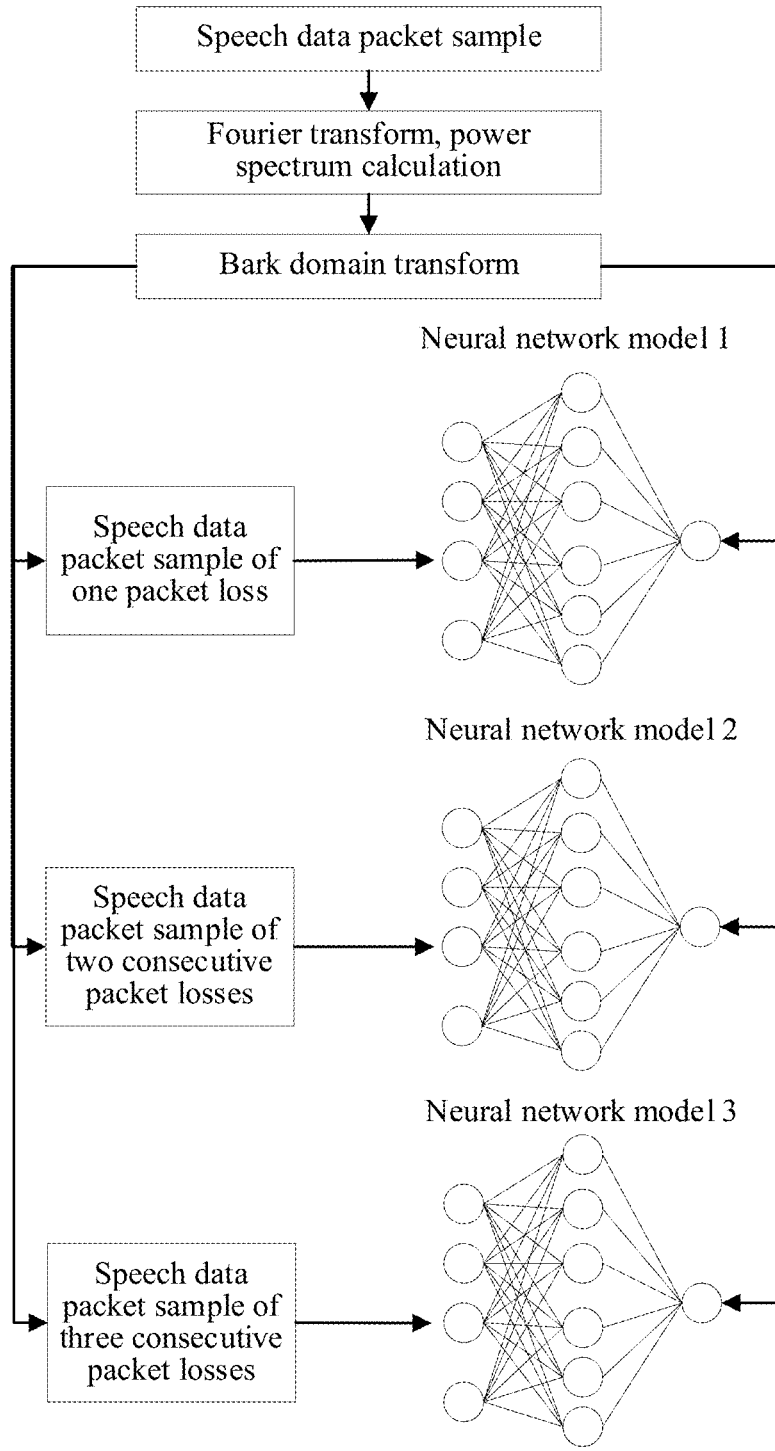
FIG. 5 is a schematic flowchart of training a neural network model in another embodiment.

In an example, an ML-based method is proposed in this embodiment to resolve the problem in the existing packet loss concealment technology. Because the ML such as the neural network that has a large quantity of storage and simulation units may be trained by using a large quantity of speech data samples, a speech signal at a position of a packet loss is better fitted, and a real signal is approached during continuous training and learning. Details are as follows:

As shown in FIG. 5, a speech data sample in a time domain (where the speech data sample is a sample in which one or more consecutive packets are lost) is obtained, and Fourier transform and bark domain transform are then sequentially performed on the speech data sample, to obtain a speech power spectrum sample in different bark sub-bands of speech frames.

The speech power spectrum sample in which one or more consecutive packet losses are simulated is used as an input of the neural network model, and an original frame power spectrum at a position of a packet loss is used as an output of the neural network model, to perform model training.

Under different quantities of packet losses, because neural network models have different fitting difficulties and fitting precisions, to obtain better fitting quality and higher efficient training, corresponding independent neural network models are used for training for different quantities of consecutive packet losses in this embodiment. For example, for a scenario of one packet loss, a neural network model 1 may be used for training and learning; and for a scenario of two consecutive packet losses, a neural network model 2 is used for training and learning, and the rest is deduced by analogy.

Figure 6:
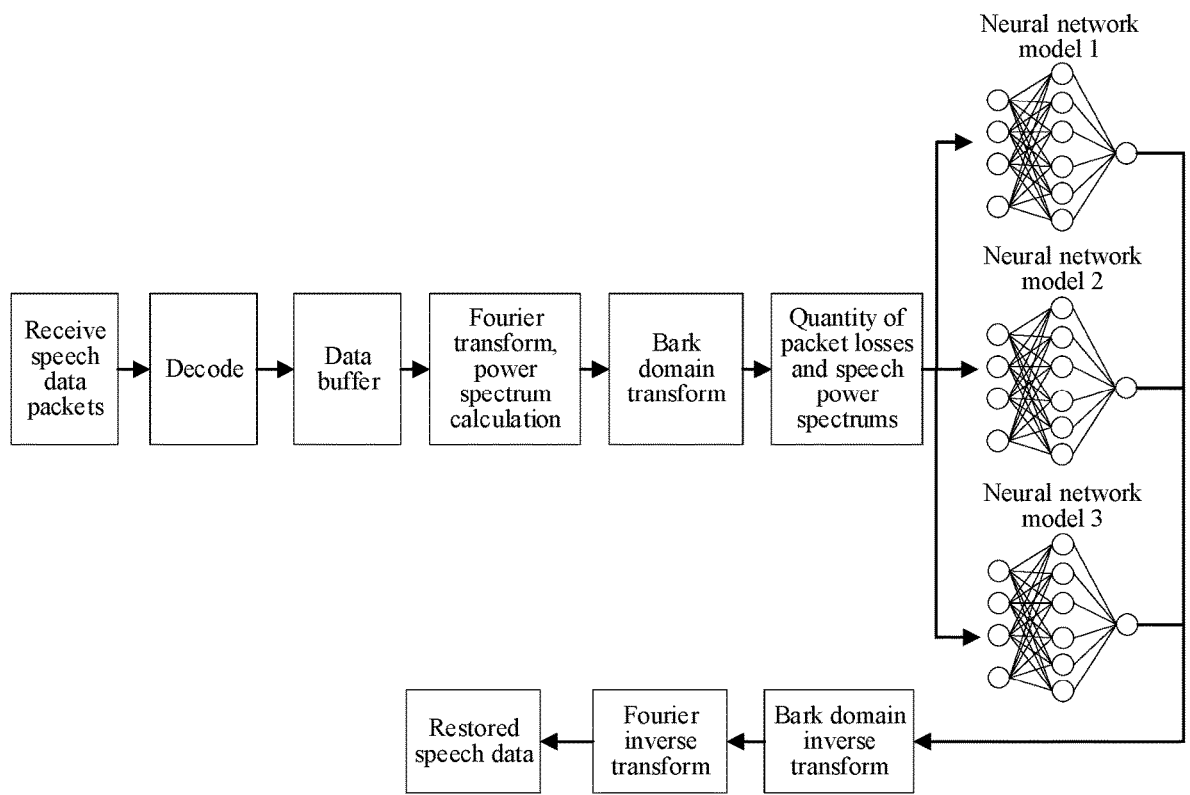
FIG. 6 is a schematic flowchart of a packet loss concealment method in another embodiment.

After the training of the neural network models is completed, the trained neural network models are applied to real-time service applications. As shown in FIG. 6, during a speech call, speech decoding is performed on received speech data packets, and PCM speech data obtained through decoding is buffered. While the speech data packets are received, packet losses are counted, that is, a quantity of consecutive packet losses is counted. When a packet loss occurs, a corresponding neural network model is selected according to a quantity of consecutive packet losses, and Fourier transform and bark domain transform are performed on buffered speech data, to obtain a limited quantity of speech power spectrums. During the Fourier transform, a previous frame of phase information of the packet loss is obtained. The speech power spectrums are used as an input of the neural network models, and outputted lost frame power spectrums are obtained by using trained neural network models, are next subject to bark domain inverse transform to obtain speech power spectrums in a linear frequency domain, and are then subject to Fourier inverse transform by combining the speech power spectrums in the linear frequency domain and the previous frame of the phase information of the packet loss, to obtain final restored speech signals. An amplitude of the foregoing speech power spectrum in a linear frequency domain is predicted based on the neural network model.

For a change of the Fourier transform and the bark domain, a specific process is as follows:

First, when a speech data packet is received, the speech data packet is decoded, to obtain PCM speech data. Then, the speech data is framed and windowed, and Fourier transform is then performed on the windowed speech data, to convert a time domain signal into a frequency domain.

For example, a window length of 20 ms as one frame is used, to select a Hamming window for windowing. The window function is as follows:

$$\text{win}(n) = 0.5 \times \left(1 + \cos\left(2\pi \frac{n}{N-1}\right)\right),$$

$n$ belonging to $\left[-\frac{N-1}{2}, \frac{N-1}{2}\right].$

Fourier transform is performed on the framed and windowed speech data, and the formula is as follows:

$$X(i, k) = \sum_{n=0}^{N-1} x(n)\text{win}(n)e^{-j\frac{2\pi nk}{N}}, k = 1, 2, 3, \ldots, N,$$

N being a window length (a total quantity of sample points in a single window).

After the Fourier transform, power values of frequency points are further calculated, to obtain a speech power spectrum according to a transform result. The calculation formula is as follows:

$S(i,k)=|X(i,k)|^2$, k=1, 2, 3, . . . , N, i corresponding to a frame number, and k corresponding to a frequency point index value.

After a speech power spectrum S(i,k) in a linear frequency domain is obtained, average calculation may be performed on power spectrum values in bark domain sub-bands according to 24 bark domains (where a frequency domain criticality is defined as shown in Table 1) simulated based on an auditory filter proposed by Eberhanrd Zwicker, to obtain a speech power spectrum in a bark domain. The formula is as follows:

$$S_{bark}(i, m) = \frac{1}{f_{top}(m) - f_{bottom}(m) + 1} \times \sum_{j=f_{bottom}(m)}^{f_{top}(m)} S(i, j),$$

m being a bark sub-band serial number, and $f_{top}(m)$ and $f_{bottom}(m)$ being respectively an upper limit of a cut-off frequency and a lower limit of the cut-off frequency of a linear frequency corresponding to an $m^{th}$ sub-band.

Through implementation of this embodiment, a speech signal at a position of a packet loss can be better fitted, and a real signal is approached during continuous training and learning, thereby improving the speech call quality.

Figure 7:
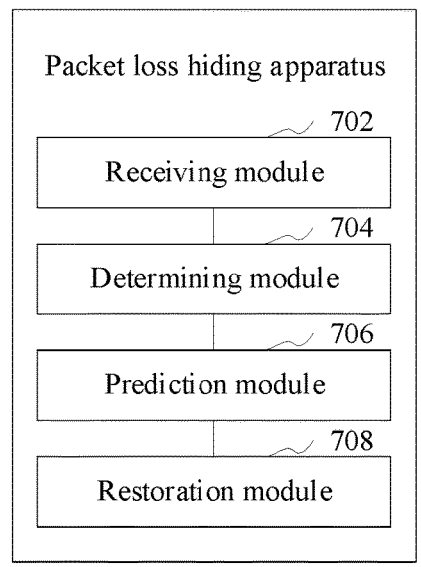
FIG. 7 is a structural block diagram of a packet loss concealment apparatus in an embodiment.

In an embodiment, as shown in FIG. 7, a packet loss concealment apparatus is provided. The packet loss concealment apparatus specifically includes: a receive module 702, a determining module 704, a prediction module 706, and a restoration module 708.

The receiving module 702 is configured to receive a speech data packet;

the determining module 704 is configured to determine, according to the speech data packet, that a packet loss occurs, and transform speech data in the speech data packet, to obtain a speech power spectrum according to a transform result;

the prediction module 706 is configured to perform lost frame prediction on the speech power spectrum by using a neural network model, to obtain a predicted lost frame power spectrum; and the restoration module 708 is configured to determine restored speech data according to the speech power spectrum and the predicted lost frame power spectrum.

In the foregoing embodiment, a speech power spectrum is determined by using speech data in the received speech data packet, and lost frame prediction is performed on the speech power spectrum by using the neural network model to obtain a lost frame power spectrum, so that a lost frame power spectrum corresponding to the speech data of the packet loss may be obtained, and restored speech data is obtained by using the speech power spectrum and the predicted lost frame power spectrum, thereby avoiding that a final pitch period waveform signal of a previous frame is directly copied to a frame position of the packet loss, and further avoiding the problem of the poor speech quality caused by a difference between adjacent speech signals. Consequently, the speech call quality is effectively improved.

Figure 8:
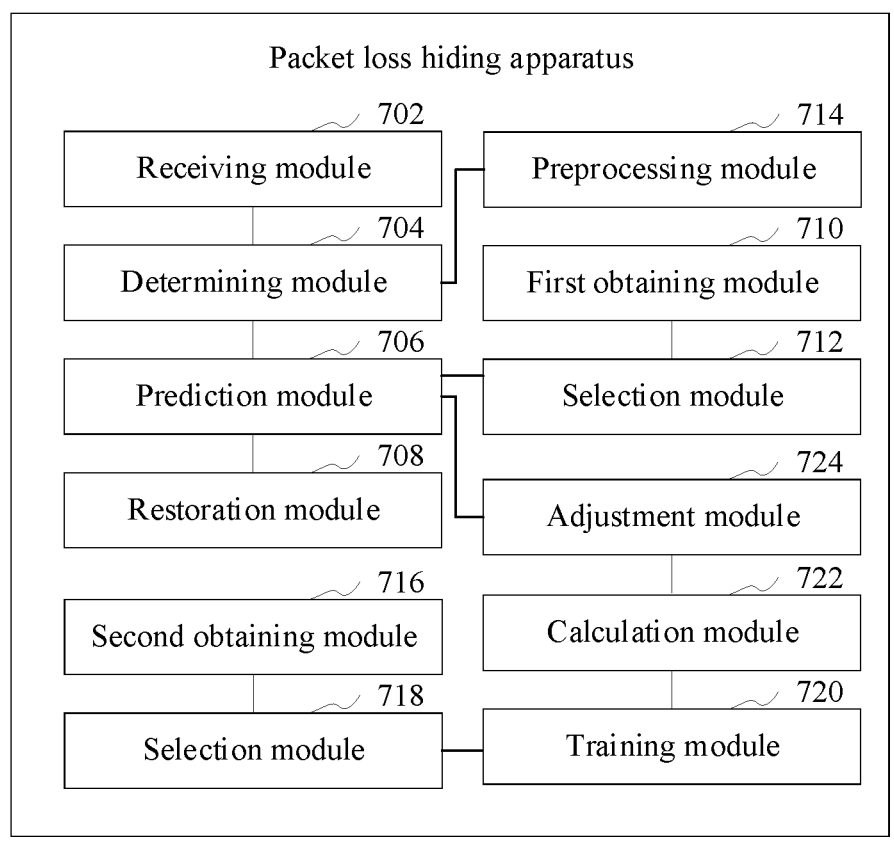
FIG. 8 is a structural block diagram of a packet loss concealment apparatus in another embodiment.

In an embodiment, as shown in FIG. 8, the apparatus further includes: a first obtaining module 710 and a selection module 712.

The determining module 704 is further configured to determine a packet loss parameter according to the received speech data packet;

the selection module 712 is configured to select a neural network model corresponding to the packet loss parameter;

the first obtaining module 710 is configured to obtain current network state information;

the selection module 712 is further configured to select a corresponding neural network model according to the network state information; and the prediction module 706 is further configured to perform lost frame prediction on the speech power spectrum by using the selected neural network model.

In an embodiment, the determining module 704 is further configured to: decode the speech data packet, to obtain speech data;

perform Fourier transform on the speech data, to obtain frequency domain speech data; and calculate power values of frequency points according to the frequency domain speech data, to obtain a speech power spectrum in a linear frequency domain.

In an embodiment, as shown in FIG. 8, the apparatus further includes: a preprocessing module 714, where the preprocessing module 714 is configured to frame the speech data; and window the framed speech data, to obtain windowed speech data; and the determining module 704, further configured to perform Fourier transform on the windowed speech data.

In an embodiment, the restoration module 708 is further configured to perform Fourier inverse transform on the speech power spectrum and the predicted lost frame power spectrum, to obtain the restored speech data.

In an embodiment, the restoration module 708 is further configured to obtain phase information of speech data of a previous frame of the lost packet during the Fourier transform; perform Fourier inverse transform on the speech power spectrum; and perform Fourier inverse transform by combining the phase information with the lost frame power spectrum.

In an embodiment, the determining module 704 is further configured to perform bark domain transform on the speech power spectrum in a linear frequency domain, to obtain a speech power spectrum in a bark domain; or perform Mel scale transform on the speech power spectrum in a linear frequency domain, to obtain a speech power spectrum in a Mel scale; and the prediction module 706 is further configured to perform lost frame prediction on the speech power spectrum in a bark domain or the speech power spectrum in a Mel scale by using the neural network model, to obtain the lost frame power spectrum.

In an embodiment, the determining module 704 is further configured to perform bark domain transform on the speech power spectrum in a linear frequency domain by using a bark domain transform formula, to obtain the speech power spectrum in a bark domain, the bark domain transform formula being as follows:

$$S_{bark}(i, m) = \frac{1}{f_{top}(m) - f_{bottom}(m) + 1} \times \sum_{j=f_{bottom}(m)}^{f_{top}(m)} S(i, j)$$

m being a bark sub-band serial number, $f_{top}(m)$ and $f_{bottom}(m)$ being respectively an upper limit of a cut-off frequency and a lower limit of the cut-off frequency of a linear frequency corresponding to an $m^{th}$ sub-band in the bark domain, and S(i,j) being the speech power spectrum in a linear frequency domain.

In an embodiment, the restoration module 708 is further configured to: separately perform bark domain inverse transform on the speech power spectrum and the predicted lost frame power spectrum; perform Fourier inverse transform on the speech power spectrum through the bark domain inverse transform; and perform Fourier inverse transform by combining phase information and the lost frame power spectrum through the bark domain inverse transform, the phase information being the phase information of the previous frame of speech data of the packet loss.

In an embodiment, the restoration module 708 is further configured to separately perform Mel scale inverse transform on the speech power spectrum and the predicted lost frame power spectrum; perform Fourier inverse transform on the speech power spectrum through the Mel scale inverse transform; and perform Fourier inverse transform by combining phase information with the lost frame power spectrum through the Mel scale inverse transform, the phase information being the phase information of the previous frame of speech data of the packet loss.

In the foregoing embodiment, different quantities of packet losses correspond to different neural network models. When the quantity packet losses is determined, a lost frame power spectrum is predicted by selecting a corresponding neural network model, to effectively compensate for packet losses with various quantities of packet losses, thereby effectively improving the speech call quality.

In an embodiment, as shown in FIG. 8, the apparatus further includes: a second obtaining module 716, a selection module 718, a training module 720, a calculation module 722, and an adjustment module 724.

The second obtaining module 716 is configured to obtain a speech power spectrum sample, the speech power spectrum sample being obtained by transforming a speech data sample in which one or more consecutive packets are lost;

the selection module 718 is configured to select a neural network model corresponding to a packet loss parameter or network state information, the packet loss parameter being used for representing a packet loss situation of a packet loss occurring in the speech data sample;

the training module 720 is configured to input the speech power spectrum sample into the neural network model for training, to obtain a trained lost frame power spectrum;

the calculation module 722 is configured to calculate a loss value of the trained lost frame power spectrum by using a reference speech power spectrum, the reference speech power spectrum being obtained by transforming an original speech data packet of the lost packets in the speech data sample; and the adjustment module 724 is configured to adjust parameters of the neural network model according to the loss value.

In an embodiment, the second obtaining module 716 is further configured to obtain the speech data sample in which the one or more consecutive packets are lost; perform Fourier transform on the speech data sample, to obtain trained frequency domain speech data; and calculate power values of frequency points according to the trained frequency domain speech data, to obtain a speech power spectrum sample in a linear frequency domain.

In an embodiment, the determining module 704 is further configured to perform bark domain transform on the speech power spectrum sample in a linear frequency domain, to obtain a speech power spectrum sample in a bark domain; or perform Mel scale transform on the speech power spectrum sample in a linear frequency domain, to obtain a speech power spectrum sample in a Mel scale; and the training module 720 is further configured to input the speech power spectrum sample in a bark domain or the speech power spectrum sample in a Mel scale into the neural network model for training.

In the foregoing embodiment, different neural network models are trained by using speech data samples with different quantities of packet losses, to obtain corresponding trained neural network models. Therefore, during actual application, when the terminal receives the speech data packets, if the packet loss is determined and a quantity of packet losses is determined, a lost frame power spectrum is predicted by selecting a corresponding neural network model, to effectively compensate for packet losses with various quantities of packet losses, thereby effectively improving the speech call quality.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

FIG. 2 to FIG. 4 are schematic flowcharts of a packet loss concealment method in an embodiment. It is to be understood that steps in the flowcharts in FIG. 2 to FIG. 4 are displayed sequentially based on indication of arrows, but the steps are not necessarily performed sequentially based on the sequence indicated by the arrows. Unless clearly specified in this specification, there is no strict sequence limitation on the execution of the steps, and the steps may be performed in another sequence. In addition, at least some steps in FIG. 2 to FIG. 4 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Figure 9:
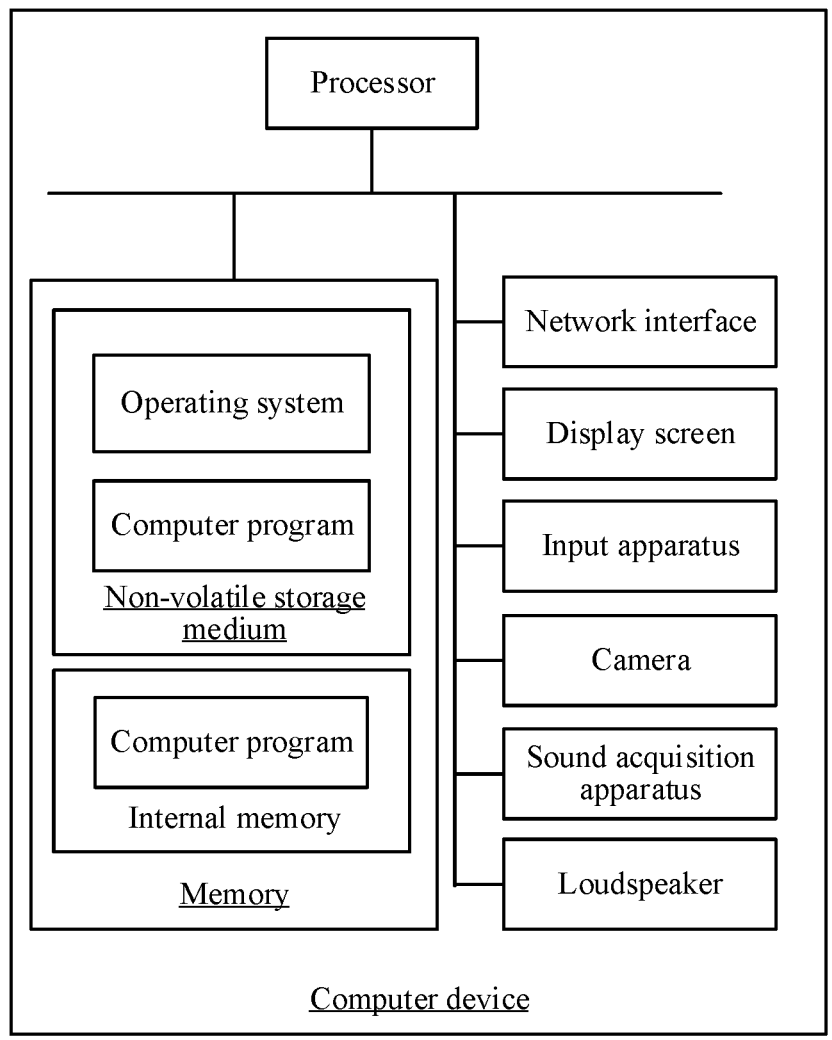
FIG. 9 is a structural block diagram of a computer device in an embodiment.

FIG. 9 is a diagram of an internal structure of a computer device in an embodiment. The computer device may be specifically the terminal 110 in FIG. 1. As shown in FIG. 9, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store a computer program. The computer program, when executed by the processor, may cause the processor to implement the packet loss concealment method. The internal memory may also store a computer program. The computer program, when executed by the processor, may cause the processor to perform the packet loss concealment method. The display screen of the computer device may be a liquid crystal display screen or an e-ink display screen. The input apparatus of the computer device may be a touch layer covering a display screen, or may be a button, a trackball, or a touch panel disposed on a housing of the computer device, or may be an external keyboard, a touch panel, or a mouse.

A person skilled in the art may understand that, the structure shown in FIG. 9 is only a block diagram of a part of a structure related to a solution of the present disclosure and does not limit the computer device to which the solution of the present disclosure is applied. Specifically, the computer device may include more or fewer components than those in the drawings, or include a combination of some components, or include different component layouts.

In an embodiment, the packet loss concealment apparatus provided in the present disclosure may be implemented in a form of a computer program, and the computer program may run on the computer device shown in FIG. 9. The memory of the computer device may store program modules forming the packet loss concealment apparatus, for example, the receiving module 702, the determining module 704, the prediction module 706, and the restoration module 708 shown in FIG. 7. The computer program formed by the program modules causes the processor to perform the steps of the packet loss concealment method in the embodiments of the present disclosure described in this specification.

For example, the computer device shown in FIG. 9 may perform S202 by using the receiving module 702 of the packet loss concealment apparatus shown in FIG. 7. The computer device may perform S204 by using the determining module 704. The computer device may perform S204 by using the prediction module 706. The computer device may perform S208 by using the restoration module 708.

In an embodiment, a computer device is provided, including a memory and a processor, the memory storing a computer program, the computer program, when executed by the processor, causing the processor to perform the following operations: receiving a speech data packet; determining a speech power spectrum of speech data in the speech data packet in response to determining, according to the speech data packet, that a packet loss occurs; performing lost frame prediction on the speech power spectrum by using a neural network model, to obtain a predicted lost frame power spectrum; and determining restored speech data according to the speech power spectrum and the predicted lost frame power spectrum.

In an embodiment, the computer program, when executed by the processor, causes the processor to further perform the following steps: determining a packet loss parameter according to the received speech data packet, and selecting a neural network model corresponding to the packet loss parameter; or obtaining current network state information, and selecting a corresponding neural network model according to the network state information; and performing lost frame prediction on the speech power spectrum by using the selected neural network model.

In an embodiment, the computer program, when executed by the processor to perform the step of transforming the speech data in the speech data packet, to obtain a speech power spectrum according to a transform result, causes the processor to specifically perform the following steps: decoding the speech data packet, to obtain speech data; performing Fourier transform on the speech data, to obtain frequency domain speech data; and calculating power values of frequency points according to the frequency domain speech data, to obtain a speech power spectrum in a linear frequency domain.

In an embodiment, the computer program, when executed by the processor, causes the processor to further perform the following steps: framing the speech data; windowing the framed speech data, to obtain windowed speech data; and performing Fourier transform on the windowed speech data.

In an embodiment, the computer program, when executed by the processor to perform the step of determining restored speech data according to the speech power spectrum and a predicted lost frame power spectrum, causes the processor to specifically perform the following steps: performing Fourier inverse transform on the speech power spectrum and the predicted lost frame power spectrum, to obtain the restored speech data.

In an embodiment, the computer program, when executed by the processor, causes the processor to further perform the following steps: obtaining phase information of speech data of a previous frame of the lost packet during the Fourier transform; and the computer program, when executed by the processor to perform the step of performing inverse transform corresponding to the transform on the speech power spectrum and the predicted lost frame power spectrum, causes the processor to specifically perform the following steps: performing Fourier inverse transform on the speech power spectrum; and performing Fourier inverse transform by combining the phase information with the lost frame power spectrum.

In an embodiment, the computer program, when executed by the processor, causes the processor to further perform the following steps: performing bark domain transform on the speech power spectrum in a linear frequency domain, to obtain a speech power spectrum in a bark domain; or performing Mel scale transform on the speech power spectrum in a linear frequency domain, to obtain a speech power spectrum in a Mel scale; and performing lost frame prediction on the speech power spectrum in a bark domain or the speech power spectrum in a Mel scale by using the neural network model, to obtain the lost frame power spectrum.

In an embodiment, the computer program, when executed by the processor to perform the step of performing bark domain transform on the speech power spectrum in a linear frequency domain, to obtain a speech power spectrum in a bark domain, causes the processor to specifically perform the following steps: performing bark domain transform on the speech power spectrum in a linear frequency domain by using a bark domain transform formula, to obtain the speech power spectrum in a bark domain, the bark domain transform formula being as follows:

$$S_{bark}(i,m) = \frac{1}{f_{top}(m) - f_{bottom}(m) + 1} \times \sum_{j=f_{bottom}(m)}^{f_{top}(m)} S(i,j)$$

m being a bark sub-band serial number, $f_{top}(m)$ and $f_{bottom}(m)$ being respectively an upper limit of a cut-off frequency and a lower limit of the cut-off frequency of a linear frequency corresponding to an $m^{th}$ sub-band in the bark domain, and $S(i,j)$ being the speech power spectrum in a linear frequency domain.

In an embodiment, the computer program, when executed by the processor to perform the step of performing inverse transform corresponding to the transform on the speech power spectrum and the predicted lost frame power spectrum, causes the processor to specifically perform the following steps: separately performing bark domain inverse transform on the speech power spectrum and the predicted lost frame power spectrum; performing Fourier inverse transform on the speech power spectrum through the bark domain inverse transform; and performing Fourier inverse transform by combining phase information and the lost frame power spectrum through the bark domain inverse transform, the phase information being the phase information of the previous frame of speech data of the packet loss.

In an embodiment, the computer program, when executed by the processor to perform the step of performing inverse transform corresponding to the transform on the speech power spectrum and the predicted lost frame power spectrum, causes the processor to specifically perform the following steps: separately performing Mel scale inverse transform on the speech power spectrum and the predicted lost frame power spectrum; performing Fourier inverse transform on the speech power spectrum through the Mel scale inverse transform; and performing Fourier inverse transform by combining phase information with the lost frame power spectrum through the Mel scale inverse transform, the phase information being the phase information of the previous frame of speech data of the packet loss.

In an embodiment, the computer program, when executed by the processor, causes the processor to further perform the following steps: obtaining a speech power spectrum sample, the speech power spectrum sample being obtained by transforming a speech data sample in which one or more consecutive packets are lost; selecting a neural network model corresponding to a packet loss parameter or network state information, the packet loss parameter being used for representing a packet loss situation of a packet loss occurring in the speech data sample; inputting the speech power spectrum sample into the neural network model for training, to obtain a trained lost frame power spectrum; calculating a loss value of the trained lost frame power spectrum by using a reference speech power spectrum, the reference speech power spectrum being obtained by transforming an original speech data packet of the lost packets in the speech data sample; and adjusting parameters of the neural network model according to the loss value.

In an embodiment, the computer program, when executed by the processor to perform the step of obtaining a speech power spectrum sample, causes the processor to specifically perform the following steps: obtaining the speech data sample in which the one or more consecutive packets are lost; performing Fourier transform on the speech data sample, to obtain trained frequency domain speech data; and calculating power values of frequency points according to the trained frequency domain speech data, to obtain a speech power spectrum sample in a linear frequency domain.

In an embodiment, the computer program, when executed by the processor, causes the processor to further perform the following steps: performing bark domain transform on the speech power spectrum sample in a linear frequency domain, to obtain a speech power spectrum sample in a bark domain; or performing Mel scale transform on the speech power spectrum sample in a linear frequency domain, to obtain a speech power spectrum sample in a Mel scale; and inputting the speech power spectrum sample in a bark domain or the speech power spectrum sample in a Mel scale into the neural network model for training.

In an embodiment, a non-transitory computer-readable storage medium is provided, storing a computer program, the computer program, when executed by a processor, causing the processor to perform the following operations:

receiving a speech data packet; determining a speech power spectrum of speech data in the speech data packet in response to determining, according to the speech data packet, that a packet loss occurs; performing lost frame prediction on the speech power spectrum by using a neural network model, to obtain a lost frame power spectrum; and determining restored speech data according to the speech power spectrum and a predicted lost frame power spectrum.

In an embodiment, the computer program, when executed by the processor, causes the processor to further perform the following steps: determining a packet loss parameter according to the received speech data packet, and selecting a neural network model corresponding to the packet loss parameter; or obtaining current network state information, and selecting a corresponding neural network model according to the network state information; and performing lost frame prediction on the speech power spectrum by using the selected neural network model.

In an embodiment, the computer program, when executed by the processor to perform the step of transforming the speech data in the speech data packet, to obtain a speech power spectrum according to a transform result, causes the processor to specifically perform the following steps: decoding the speech data packet, to obtain speech data; performing Fourier transform on the speech data, to obtain frequency domain speech data; and calculating power values of frequency points according to the frequency domain speech data, to obtain a speech power spectrum in a linear frequency domain.

In an embodiment, the computer program, when executed by the processor, causes the processor to further perform the following steps: framing the speech data; windowing the framed speech data, to obtain windowed speech data; and performing Fourier transform on the windowed speech data.

In an embodiment, the computer program, when executed by the processor to perform the step of determining restored speech data according to the speech power spectrum and a predicted lost frame power spectrum, causes the processor to specifically perform the following steps: performing Fourier inverse transform on the speech power spectrum and the predicted lost frame power spectrum, to obtain the restored speech data.

In an embodiment, the computer program, when executed by the processor, causes the processor to further perform the following steps: obtaining phase information of speech data of a previous frame of the lost packet during the Fourier transform; and the computer program, when executed by the processor to perform the step of performing inverse transform corresponding to the transform on the speech power spectrum and the predicted lost frame power spectrum, causes the processor to specifically perform the following steps: performing Fourier inverse transform on the speech power spectrum; and performing Fourier inverse transform by combining the phase information with the lost frame power spectrum.

In an embodiment, the computer program, when executed by the processor, causes the processor to further perform the following steps: performing bark domain transform on the speech power spectrum in a linear frequency domain, to obtain a speech power spectrum in a bark domain; or performing Mel scale transform on the speech power spectrum in a linear frequency domain, to obtain a speech power spectrum in a Mel scale; and performing lost frame prediction on the speech power spectrum in a bark domain or the speech power spectrum in a Mel scale by using the neural network model, to obtain the lost frame power spectrum.

In an embodiment, the computer program, when executed by the processor to perform the step of performing bark domain transform on the speech power spectrum in a linear frequency domain, to obtain a speech power spectrum in a bark domain, causes the processor to specifically perform the following steps: performing bark domain transform on the speech power spectrum in a linear frequency domain by using a bark domain transform formula, to obtain the speech power spectrum in a bark domain, the bark domain transform formula being as follows:

$$S_{bark}(i, m) = \frac{1}{f_{top}(m) - f_{bottom}(m) + 1} \times \sum_{j=f_{bottom}(m)}^{f_{top}(m)} S(i, j)$$

m being a bark sub-band serial number, $f_{top}(m)$ and $f_{bottom}(m)$ being respectively an upper limit of a cut-off frequency and a lower limit of the cut-off frequency of a linear frequency corresponding to an $m^{th}$ sub-band in the bark domain, and S(i,j) being the speech power spectrum in a linear frequency domain.

In an embodiment, the computer program, when executed by the processor to perform the step of performing inverse transform corresponding to the transform on the speech power spectrum and the predicted lost frame power spectrum, causes the processor to specifically perform the following steps: separately performing bark domain inverse transform on the speech power spectrum and the predicted lost frame power spectrum; performing Fourier inverse transform on the speech power spectrum through the bark domain inverse transform; and performing Fourier inverse transform by combining phase information and the lost frame power spectrum through the bark domain inverse transform, the phase information being the phase information of the previous frame of speech data of the packet loss.

In an embodiment, the computer program, when executed by the processor to perform the step of performing inverse transform corresponding to the transform on the speech power spectrum and the predicted lost frame power spectrum, causes the processor to specifically perform the following steps: separately performing Mel scale inverse transform on the speech power spectrum and the predicted lost frame power spectrum; performing Fourier inverse transform on the speech power spectrum through the Mel scale inverse transform; and performing Fourier inverse transform by combining phase information with the lost frame power spectrum through the Mel scale inverse transform, the phase information being the phase information of the previous frame of speech data of the packet loss.

In an embodiment, the computer program, when executed by the processor, causes the processor to further perform the following steps: obtaining a speech power spectrum sample, the speech power spectrum sample being obtained by transforming a speech data sample in which one or more consecutive packets are lost; selecting a neural network model corresponding to a packet loss parameter or network state information, the packet loss parameter being used for representing a packet loss situation of a packet loss occurring in the speech data sample; inputting the speech power spectrum sample into the neural network model for training, to obtain a trained lost frame power spectrum; calculating a loss value of the trained lost frame power spectrum by using a reference speech power spectrum, the reference speech power spectrum being obtained by transforming an original speech data packet of the lost packets in the speech data sample; and adjusting parameters of the neural network model according to the loss value.

In an embodiment, the computer program, when executed by the processor to perform the step of obtaining a speech power spectrum sample, causes the processor to specifically perform the following steps: obtaining the speech data sample in which the one or more consecutive packets are lost; performing Fourier transform on the speech data sample, to obtain trained frequency domain speech data; and calculating power values of frequency points according to the trained frequency domain speech data, to obtain a speech power spectrum sample in a linear frequency domain.

In an embodiment, the computer program, when executed by the processor, causes the processor to further perform the following steps: performing bark domain transform on the speech power spectrum sample in a linear frequency domain, to obtain a speech power spectrum sample in a bark domain; or performing Mel scale transform on the speech power spectrum sample in a linear frequency domain, to obtain a speech power spectrum sample in a Mel scale; and inputting the speech power spectrum sample in a bark domain or the speech power spectrum sample in a Mel scale into the neural network model for training.

A person of ordinary skill in the art may understand that some or all procedures in the method in the foregoing embodiments may be implemented by a computer program instructing related hardware. The program may be stored in a non-volatile computer-readable storage medium, and when the program is executed, the procedures in the foregoing method embodiments may be implemented. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure, which are described specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure is subject to the appended claims.

What is claimed is:

1. A packet loss concealment method, performed by a computer device at a receiver end, the method comprising:
receiving, from a computer device at a sender end, a speech data packet through a communication network based on a communication protocol, the speech data packet being encapsulated at the sender end before transmission;

determining a packet loss parameter according to the received speech data packet, the packet loss parameter indicates a quantity of consecutive packet losses occurred in the received speech data packet;

selecting, among a plurality of candidate neural network models, a neural network model according to the packet loss parameter of the speech data packet, each of the plurality of candidate neural network models being trained by using speech data samples with a same quantity of consecutive packet losses, and different candidate neural network models corresponding to different quantities of consecutive packet losses, wherein the neural network model being selected is trained by using speech data samples with a quantity of consecutive packet losses matching the packet loss parameter of the speech data packet;

determining a speech power spectrum of speech data in the speech data packet in response to determining, according to the speech data packet, that a packet loss occurs;

performing lost frame prediction on the speech power spectrum by using the neural network model, to obtain a predicted lost frame power spectrum; and determining restored speech data corresponding to the speech data packet according to the speech power spectrum and the predicted lost frame power spectrum.

2. The method according to claim 1, wherein the determining the speech power spectrum of the speech data in the speech data packet comprises:

decoding the speech data packet, to obtain the speech data;

performing Fourier transform on the speech data, to obtain frequency domain speech data; and calculating power values of frequency points according to the frequency domain speech data, to obtain a speech power spectrum in a linear frequency domain.

3. The method according to claim 2, wherein before the performing the Fourier transform on the speech data, the method further comprises:

framing the speech data; and windowing the framed speech data, to obtain windowed speech data; and the performing the Fourier transform on the speech data comprises:

performing the Fourier transform on the windowed speech data.

4. The method according to claim 2, wherein the determining the restored speech data according to the speech power spectrum and the predicted lost frame power spectrum comprises:

performing Fourier inverse transform on the speech power spectrum and the predicted lost frame power spectrum, to obtain the restored speech data.

5. The method according to claim 4, further comprising:

obtaining phase information of speech data of a previous frame of a lost packet during the Fourier transform; and the performing the Fourier inverse transform on the speech power spectrum and the predicted lost frame power spectrum comprises:

performing the Fourier inverse transform on the speech power spectrum; and performing the Fourier inverse transform by combining the phase information with the lost frame power spectrum.

6. The method according to claim 1, further comprising:

performing bark domain transform on the speech power spectrum in a linear frequency domain, to obtain a speech power spectrum in a bark domain; or performing Mel scale transform on the speech power spectrum in the linear frequency domain, to obtain a speech power spectrum in a Mel scale; and wherein the performing the lost frame prediction on the speech power spectrum by using the neural network model, to obtain the lost frame power spectrum comprises:

performing lost frame prediction on the speech power spectrum in the bark domain or the speech power spectrum in the Mel scale by using the neural network model, to obtain the lost frame power spectrum.

7. The method according to claim 6, wherein the performing the bark domain transform on the speech power spectrum in the linear frequency domain, to obtain the speech power spectrum in the bark domain comprises:

performing the bark domain transform on the speech power spectrum in the linear frequency domain according to a bark sub-band serial number m, an upper limit of a cut-off frequency and a lower limit of the cut-off frequency of a linear frequency corresponding to an $m^{th}$ sub-band in the bark domain, to obtain the speech power spectrum in the bark domain.

8. The method according to claim 6, wherein the determining the restored speech data according to the speech power spectrum and the predicted lost frame power spectrum comprises:

separately performing bark domain inverse transform on the speech power spectrum and the predicted lost frame power spectrum;

performing the Fourier inverse transform on the speech power spectrum through the bark domain inverse transform; and performing Fourier inverse transform by combining phase information and the lost frame power spectrum through the bark domain inverse transform, the phase information being the phase information of the previous frame of the speech data of the packet loss.

9. The method according to claim 6, wherein the determining the restored speech data according to the speech power spectrum and the predicted lost frame power spectrum comprises:

separately performing Mel scale inverse transform on the speech power spectrum and the predicted lost frame power spectrum;

performing the Fourier inverse transform on the speech power spectrum through the Mel scale inverse transform; and performing Fourier inverse transform by combining phase information with the lost frame power spectrum through the Mel scale inverse transform, the phase information being the phase information of the previous frame of the speech data of the packet loss.

10. The method according to claim 1, further comprising:

obtaining a speech power spectrum sample, the speech power spectrum sample being obtained by transforming a speech data sample in which one or more consecutive packets are lost;

selecting the neural network model corresponding to the packet loss parameter;

inputting the speech power spectrum sample into the neural network model for training, to obtain a trained lost frame power spectrum;

calculating a loss value of the trained lost frame power spectrum by using a reference speech power spectrum, the reference speech power spectrum being obtained by transforming an original speech data packet of lost packets in the speech data sample; and adjusting parameters of the neural network model according to the loss value.

11. The method according to claim 10, wherein the obtaining the speech power spectrum sample comprises:

obtaining the speech data sample in which the one or more consecutive packets are lost;

performing Fourier transform on the speech data sample, to obtain trained frequency domain speech data; and calculating power values of frequency points according to the trained frequency domain speech data, to obtain a speech power spectrum sample in a linear frequency domain.

12. The method according to claim 11, further comprising:

performing bark domain transform on the speech power spectrum sample in the linear frequency domain, to obtain a speech power spectrum sample in a bark domain; or performing Mel scale transform on the speech power spectrum sample in the linear frequency domain, to obtain a speech power spectrum sample in the Mel scale; and the inputting the speech power spectrum sample into the neural network model for training comprises:

inputting the speech power spectrum sample in the bark domain or the speech power spectrum sample in the Mel scale into the neural network model for training.

13. A packet loss concealment apparatus at a receiver end, comprising a memory and a processor, the memory storing a computer program, the computer program, when executed by the processor, causing the processor to:

receive, from a computer device at a sender end, a speech data packet through a communication network based on a communication protocol, the speech data packet being encapsulated at the sender end before transmission;

determine a packet loss parameter according to the received speech data packet, the packet loss parameter indicates a quantity of consecutive packet losses occurred in the received speech data packet;

select, among a plurality of candidate neural network models, a neural network model according to the packet loss parameter of the speech data packet, each of the plurality of candidate neural network models being trained by using speech data samples with a same quantity of consecutive packet losses, and different candidate neural network models corresponding to different quantities of consecutive packet losses, wherein the neural network model being selected is trained by using speech data samples with a quantity of consecutive packet losses matching the packet loss parameter of the speech data packet;

determine a speech power spectrum of speech data in the speech data packet in response to determining, according to the speech data packet, that a packet loss occurs;

perform lost frame prediction on the speech power spectrum by using the neural network model, to obtain a predicted lost frame power spectrum; and determine restored speech data corresponding to the speech data packet according to the speech power spectrum and the predicted lost frame power spectrum.

14. The apparatus according to claim 13, wherein the processor is further configured to decode the speech data packet, to obtain the speech data; perform Fourier transform on the speech data, to obtain frequency domain speech data; and calculate power values of frequency points according to the frequency domain speech data, to obtain the speech power spectrum in a linear frequency domain.

15. The apparatus according to claim 14, wherein the processor is further configured to:

frame the speech data; and window the framed speech data, to obtain windowed speech data; and perform the Fourier transform on the windowed speech data.

16. The apparatus according to claim 14, wherein the processor is further configured to perform Fourier inverse transform on the speech power spectrum and the predicted lost frame power spectrum, to obtain the restored speech data.

17. The apparatus according to claim 16, wherein the processor is further configured to:

obtain phase information of speech data of a previous frame of lost packet during the Fourier transform; and perform the Fourier inverse transform on the speech power spectrum; and perform the Fourier inverse transform by combining the phase information with the lost frame power spectrum.

18. A non-transitory computer-readable storage medium, storing a computer program, the computer program, when executed by a processor at a receiver end, causing the processor to perform:

receiving, from a computer device at a sender end, a speech data packet through a communication network based on a communication protocol, the speech data packet being encapsulated at the sender end before transmission;

determining a packet loss parameter according to the received speech data packet, the packet loss parameter indicates a quantity of consecutive packet losses occurred in the received speech data packet;

selecting, among a plurality of candidate neural network models, a neural network model according to the packet loss parameter of the speech data packet, each of the plurality of candidate neural network models being trained by using speech data samples with a same quantity of consecutive packet losses, and different candidate neural network models corresponding to different quantities of consecutive packet losses, wherein the neural network model being selected is trained by using speech data samples with a quantity of consecutive packet losses matching the packet loss parameter of the speech data packet;

determining a speech power spectrum of speech data in the speech data packet in response to determining, according to the speech data packet, that a packet loss occurs;

performing lost frame prediction on the speech power spectrum by using the neural network model, to obtain a predicted lost frame power spectrum; and determining restored speech data corresponding to the speech data packet according to the speech power spectrum and the predicted lost frame power spectrum.

* * * * *